United States Patent

[11] 3,556,130

[72] Inventor Richard N. King, Jr.
Natick, Mass.
[21] Appl. No. 761,983
[22] Filed Sept. 24, 1968
[45] Patented Jan. 19, 1971
[73] Assignee Waters Associates, Inc.
Framingham, Mass.

[54] ROTARY VALVE MOUNTING ASSEMBLY
13 Claims, 4 Drawing Figs.
[52] U.S. Cl. .................................................. 137/343, 248/67; 137/360
[51] Int. Cl. ..................................................... F16l 5/00
[50] Field of Search........................................... 137/343, 360; 251/324(in part), 325(in part); 248/67, 56

[56] References Cited
UNITED STATES PATENTS

| | | | | |
|---|---|---|---|---|
| 1,109,962 | 9/1914 | Chadwick..................... | 248/56 |
| 1,740,765 | 12/1929 | Burnett......................... | 248/56 |
| 2,932,037 | 4/1960 | Manas........................... | 248/56X |
| 2,987,283 | 6/1961 | Bleckmann................... | 248/56 |
| 3,122,168 | 2/1964 | Wright......................... | 251/367X |
| 3,199,538 | 8/1965 | Anthon......................... | 251/367X |
| 3,331,386 | 7/1967 | Politz............................ | 137/360X |
| 3,366,356 | 1/1968 | Fisher............................ | 248/56 |

*Primary Examiner*—Samuel Scott
*Attorney*—Cesari & McKenna

ABSTRACT: An improved mounting assembly supports a rotary stream-switching valve of the type having a housing and a rotor. The rotor includes a shaft and a sealing member having stream diverting grooves. The mounting assembly supports the entire valve from the valve shaft through a bushing slidably engaging over the shaft. One end of the bushing is attached to a bracket which can be secured to a suitable base. Engagement between projections on the housing and elements of the bracket prevents the housing from rotating when the valve shaft is turned to accomplish the desired stream switching. However, when sideways thrusts are imparted to the valve shaft, the valve housing is free to cock or shift with respect to the mounting so that there is no relative movement between the shaft and the housing as would tend to deform or damage the sealing member.

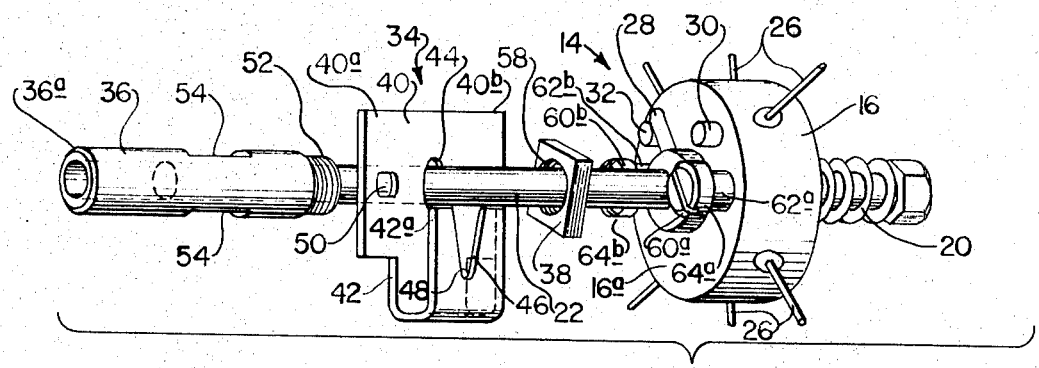
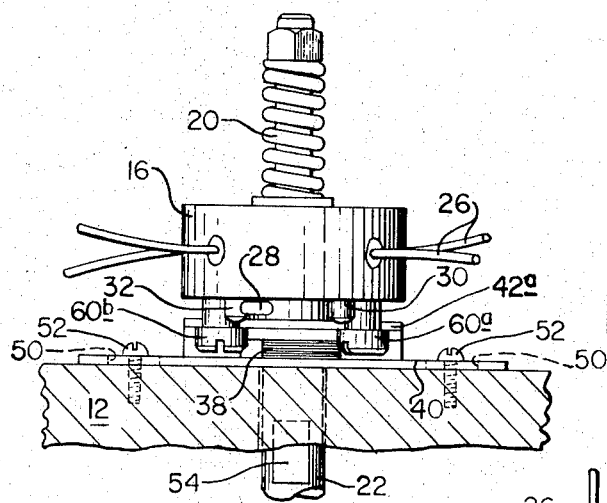
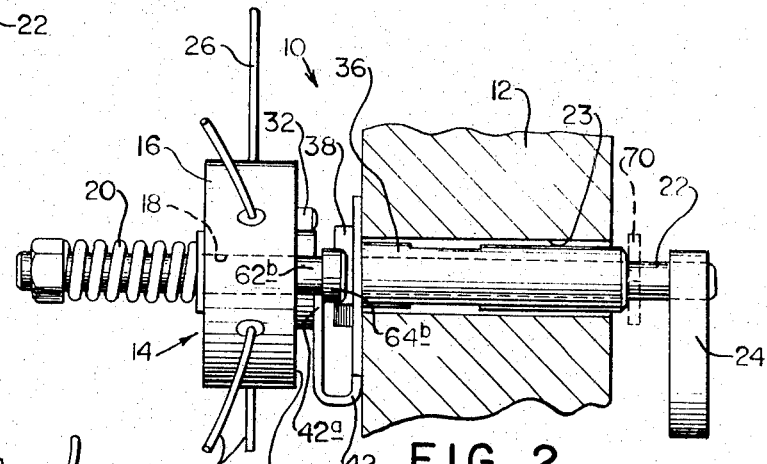
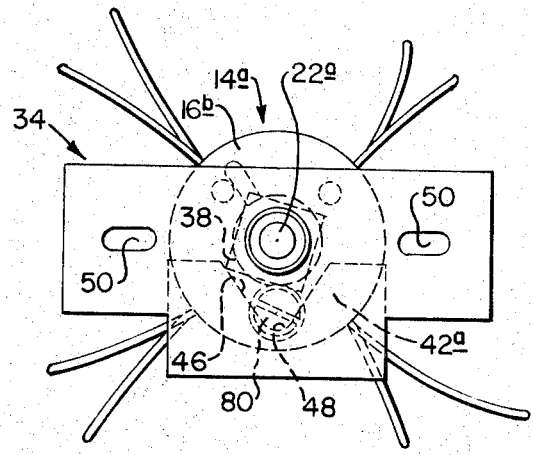
INVENTOR
RICHARD N. KING, JR.

ROTARY VALVE MOUNTING ASSEMBLY

BACKGROUND OF THE INVENTION

This invention relates to a rotary valve assembly. It relates more particularly to an improved mounting for a rotary stream-switching valve for use in the transport lines of liquid chromatography and sampling systems.

Valves of this type usually comprise a generally cylindrical housing. Small tubes communicate with radial ports extending to a central axial passage in the housing which contains a rotor. The rotor includes a protruding valve shaft and a sealing member which resiliently engages the wall of the housing passage. The surface of the sealing member has stream-diverting grooves in contact with the wall of the passage. By rotating the valve rotor to selected angular positions relative to the housing, the grooves in the sealing member may be positioned to connect selected ones of the ports in the valve housing. Typical rotary valves of this type are described in U.S. Pats. 2,757,541; 3,034,528 and 3,329,166.

It is essential that the valves used in the transport lines of liquid chromatography systems be free of leakage. In addition, the valve components must be constructed of materials which are extremely resistant to strong organic solvents. Thus, in the best valves, the valve housing and rotor are constructed of stainless steel, while the sealing member is made of polytetraflouroethylene or other similar inert, relatively resilient plastic. Each valve is designed to spring-load the plastic sealing member to provide sufficient sealing or contact pressure between the sealing member and the housing to prevent leakage.

In actual practice, however, prior rotary valves of this type do begin to leak after a relatively short period of use. The leakage is due primarily to deformation of the sealing member because of inadvertent sideways thrust on the valve shaft by the operator. That is, an operator may accidentally turn the rotor into its stops, thereby imparting a sideways thrust to it; or he may pull down on it. While these sideways forces may be relatively small, they are often enough to produce sufficient cold flow of the plastic in the sealing member to permanently deform it and cause leakage. In many cases, even slight leakage is enough to spoil the chromatographic analysis; at the very least, it results in the system having to be shut down while the valve is repaired or replaced.

SUMMARY OF THE INVENTION

Accordingly, it is an object of the present invention to provide a mounting assembly for a rotary valve which prolongs the useful life of the valve itself.

Another object of the invention is to provide a mounting assembly for a rotary valve which minimizes stresses on the valve components which tend to cause the valve to leak.

Still another object of the invention is to provide an improved rotary valve-mounting assembly which is relatively inexpensive to manufacture and easy to install.

Another object of the invention is to provide a standard rotary valve mounting assembly which is suitable for use with different rotary valve models.

Still another object of the invention is to provide an improved mounting assembly for a rotary valve which minimizes unwanted relative movement between the stationary and moving components of the valve.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the present mounting assembly supports the entire valve by the valve rotor, or more specifically by the rotor extension or shaft. It includes a bushing which slidably engages over the shaft. The end of the bushing facing the housing is rigidly secured to a bracket which, in use, is affixed to a supporting wall.

Screws projecting from the housing engage portions of the bracket to prevent the housing from rotating relative to the bracket and also to prevent the valve from pulling away from the mounting assembly. Thus, when an operator turns the valve shaft, the rotor turns inside the housing because the latter cannot rotate because of the aforesaid engagement with the bracket and so the desired stream switching takes place. However, if the operator inadvertently turns the valve shaft into the stops or otherwise pushes sideways on it, the valve housing is free to cock or tilt relative to the mounting assembly. Consequently, there is no relative movement between the rotor and the housing as would tend to compress or deform the plastic-sealing member on the rotor, and cause leakage.

In some applications, a collar is affixed to the valve shaft just ahead of the bushing. This limits movement of the rotor towards the housing and minimizes damage to the valve-sealing member due to axial thrusts on the valve shaft.

Valves supported by my improved mounting assembly suffer a minimum amount of down time and have a relatively long, useful life. Moreover, when the sealing member in the valve finally does require replacement, the valve can be removed easily from its mounting and replaced without requiring any special tools or other equipment. Also, the present mounting has only a few parts all of which are relatively easy and inexpensive to make.

BRIEF DESCRIPTION OF THE DRAWING

For a fuller understanding of the nature and objects of the invention, reference should be had to the following detailed description taken in connection with the accompanying drawing, in which:

FIG. 1 is an exploded perspective view showing the elements of my mounting assembly and a typical rotary valve;

FIG. 2 is a side elevational view with parts broken away of the FIG. 1 elements fully assembled on the valve;

FIG. 3 is a top plan view thereof; and

FIG. 4 is a front elevational view of the mounting assembly supporting a different valve model.

DESCRIPTION OF THE PREFERRED EMBODIMENT

Referring first to FIG. 2 of the drawing, the present mounting assembly indicated generally at 10 is secured to a supporting housing wall 12. The mounting assembly rigidly supports a conventional rotary stream-switching valve indicated generally at 14.

Valve 14 has a generally cylindrical housing 16 with a central axial passage 18. A rotor assembly 20 is mounted in passage 18 and carries a sleevelike plastic-sealing member (not shown) which tightly engages the passage 18 wall. Rotor assembly 20 also has a relatively long shaft 22 protruding from housing 16 which extends through mounting assembly 10 and a passage 23 in wall 12. A knob or handle 24 secured to the free end of valve shaft 22 facilitates turning rotor assembly 20 with respect to its housing 16.

Referring now to FIG. 1, when rotor assembly 20 is turned by its handle 24, its sealing member interconnects selected ones of tubes 26 which communicate with passage 18. The illustrated valve has only two operative positions. In one position, valve shaft 22 is turned fully clockwise until a lug 28 projecting up from the shaft engages a pin 30 projecting out from the front face 16a of housing 16. In the other operative position of the valve, the valve shaft is turned fully counterclockwise until lug 28 engages a pin 32 extending out from housing 16. It should be understood, however, that stream-switching valves used in chromatography and sampling systems may have several operative positions of the rotor and as many as twenty or more such tubes 26 to accomplish very complex stream switching. The construction and operation of these valves are described in detail in the aforementioned U.S. patents.

Still referring to FIG. 2, mounting assembly 10 comprises three basic elements, to wit: a bracket 34, a bushing 36 and a nut 38. All of these elements coact to support valve 10 from its stem 22 so that sideways thrusts on the valve will not damage the rotor assembly 20, and specifically its internal plastic-sealing member. Yet, assembly 10 permits the operator to turn valve shaft 22 to accomplish the desired stream switching.

Bracket 34 comprises a generally T-shaped plate 40 having arms 40a and 40b and a leg 42. A passage 44 is formed in plate 40 above leg 42 and midway between arms 40a and 40b. The diameter of opening 44 is larger than that of shaft 22 so that the latter can be loosely received in opening 44.

Leg 42 is folded back on itself to form an upstanding lip 42a. Lip 42a extends up to a line approximately even with the lower edge of opening 44. For reasons to be described in more detail later, a V-shaped groove 46 is formed in lip 42a midway between the side edges thereof. Also, the bottom of groove 46 is rounded out at 48.

A pair of screw openings 50 are formed in arms 40a and 40b on each side of opening 44. In use, screws 52 are inserted through openings 50 to secure bracket 40 to its supporting wall 12 as shown in FIG. 3.

Still referring to FIG. 1, bushing 36 is a generally cylindrical sleeve having an inner diameter only slightly larger than the diameter of shaft 22. The outer diameter of bushing 36 is slightly larger than that of opening 44 in bracket 40. Bushing 36 also has a reduced diameter threaded portion 52 at one end thereof. The diameter of threaded portion 52 is slightly less than that of opening 44 so that end 52 can be received snugly in opening 44. The opposite end 36a of bushing 36 is beveled. Also, opposite side portions 54 of the bushing are flattened to facilitate engaging the bushing by a wrench or other similar tool capable of rotating it about its longitudinal axis.

Nut 38 is a conventional square nut having a centrally threaded opening 58 arranged to threadedly engage end portion 52 of bushing 36.

Prior to installing valve 14 in mounting assembly 10, a pair of similar, flatheaded screws 60a and 60b are screwed into valve housing face 16a on opposite sides of valve shaft 22. Screws 60a and 60b have relatively long shanks 62a and 62b, respectively, terminating in relatively large diameter slotted heads 64a and 64b, respectively.

When mounting valve 14, nut 38 is first slid onto shaft 22. Then, the valve shaft is inserted through opening 40 in bracket 34 so that lip 42a on the bracket faces housing face 16a as seen in FIG. 1. Next bracket 34 is cocked slightly to permit lip 42a to engage under screws 60a and 60b. The length of the screw shanks 62a and 62b is such that when bracket 34 is oriented vertically, i.e. perpendicular to the axis of valve stem 22, the top edge of lip 42a engages behind the screw heads 64a and 64b as best seen in FIGS. 2 and 3.

Following this, bushing 36 is slid onto valve shaft 22 until its threaded end portion 52 protrudes through opening 40 in bracket 34. Nut 38 is then screwed down end portion 52. The bushing and nut are tightened by turning the bushing with a wrench engaging its flattened portions 54. Nut 38 is prevented from turning along with the bushing because it engages one or both of screw heads 64a and 64b.

Following this, shaft 22 and bushing 36 are inserted through passage 23 in wall 12 and bracket 34 is secured to wall 12 by screws 52 (FIG. 3). Preferably bushing 36 should be long enough to extend all the way through wall 12. Finally handle 24 (FIG. 2) is affixed to the free end of valve shaft 22.

As best seen in FIGS. 2 and 3, mounting assembly 10, through its bushing 36, supports the entire valve 14 by its shaft 22. That is, there is no rigid connection at all between mounting assembly 10 and valve housing 16. Rather, when the operator rotates shaft 22 to either of its operative positions, bracket lip 42a engages screws 60a and 60b to prevent valve housing 16 from turning along with the shaft. Thus, rotor assembly 20 turns relative to housing 16 to interconnect the proper tubes 26. The engagement of lip 42a behind screw heads 64a and 64b also prevents shaft 22 from pulling out of bushing 36. However, some axial play may be allowed in this engagement without adversely affecting operation of the valve assembly.

On the other hand, if the operator inadvertently pushes sideways on shaft 22, this force is not transmitted to the internal plastic sealing member on rotor assembly 20 because valve housing 16 is free to tilt or cock along with rotor assembly 20 with respect to mounting assembly 10. Thus, there is no relative movement between the rotor assembly and housing 16 as would tend to permanently deform the sealing member and cause the valve to leak.

In some applications, it may also be desirable to protect rotor assembly 20 from damage due to axial thrusts on valve shaft 22. This is easily accomplished by affixing a collar to shaft 22 just ahead of bushing 36 after mounting the valve in assembly 10. Such a collar is indicated in dotted lines at 70 in FIG. 2. Now any axial pushing forces on shaft 22 are transmitted by collar 70 directly to bushing 36 and thence to bracket 34. Accordingly, there is no appreciable relative movement between rotor assembly 20 and valve housing 16 which might tend to distort the sealing member within the valve.

My mounting assembly 10 is also able to support valve models having more tubes 26 and therefore requiring a different arrangement of its bracket-engaging screws. One such valve model 14a is shown in FIG. 4. It employs a single screw 80 in lieu of screws 60a and 60b on the FIG. 1 valve. Screw 80 is similar to screw 60a or 60b except that it is located directly below valve stem 22a and in position to engage in the V-shaped bracket groove 46 and, more specifically, in the rounded-out bottom 48 thereof.

Screw 80 functions in much the same manner as screws 60a and 60b in FIGS. 1—3. That is, it prevents relative movement between valve housing 16b and bracket 34 when the valve stem 22a is turned. On the other hand, the engagement between screw 80 and bracket 34 still permits the valve 14a to cock as a unit with respect to the mounting assembly when sideways forces are applied inadvertently to its valve shaft 22a. Therefore no compression forces are developed which might cause cold flow of the plastic-sealing member.

It will be seen from the foregoing then that the described mounting assembly greatly prolongs the useful life of rotary fluid-switching valves. Not only may these valves now be used for longer periods without maintenance, but also there is relatively little likelihood that the valves will leak and spoil the results of any sampling procedure or analysis being carried out. Still, the mounting assembly is relatively easy and inexpensive to make. Moreover, it may be installed quickly on different valve models by relatively unskilled personnel.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. An improved mounting assembly for a rotary valve of the type having a housing and a rotor including a shaft protruding from the housing, said mounting comprising:
   A. a sleeve member for slidably receiving on and engaging said shaft;
   B. means for securing said sleeve member to a support;
   C. means projecting from said sleeve towards said housing to
      1. prevent said housing from rotating with respect to said sleeve member when said shaft is turned, and
      2. allow said housing to cock with respect to said sleeve member so that the entire valve moves as a unit when sideways forces are applied to said shaft with the result that substantially no relative movement occurs between said rotor and said housing due to said sideways forces.

2. An improved mounting assembly as defined in claim 1 and further including means on said mounting assembly for engaging portions of said valve to prevent said shaft from sliding axially out of said sleeve member.

3. An improved mounting assembly as defined in claim 2 and further including means for:
   A. connecting to said shaft; and
   B. slidably engaging said sleeve member to prevent said shaft from moving axially relative to said sleeve member.

4. An improved mounting assembly for a rotary valve of the type having a housing and a rotor including a shaft protruding from the housing, said mounting comprising:
   A. a sleeve arranged to snugly engage over said shaft, said sleeve having a collar at one end extending out away from its longitudinal axis, said collar having a projecting portion arranged to
      1. prevent said housing from rotating with respect to said mounting assembly when said shaft is turned, and
      2. allow said housing to cock with respect to said sleeve so that the entire valve moves as a unit when sideways forces are applied to said shaft whereby substantially no relative movement occurs between said rotor and said housing due to said sideways forces.

5. An improved mounting assembly as defined in claim 4 and further including means for retaining said shaft in said sleeve.

6. An improved mounting assembly for a rotary valve of the type having a housing and a rotor including a shaft protruding from the housing, said mounting comprising:
   A. a generally T-shaped plate, the leg of said plate being folded back on itself to form an upstanding lip;
   B. means defining an opening in said plate just above said lip, said opening being appreciably larger than the cross section of said shaft;
   C. a relatively long bushing for
      1. slidably engaging said shaft,
      2. being secured on one end to said plate coaxially with said opening,
   D. means for securing said bushing to said plate.

7. An improved mounting assembly as defined in claim 6 wherein said lip has a relatively large wedge-shaped slot positioned just below said opening.

8. An improved mounting assembly as defined in claim 6 and further including means for securing said plate to a supporting wall.

9. An improved mounting assembly as defined in claim 6 wherein:
   A. said one bushing end has a reduced diameter threaded portion adapted to be received in said opening, and
   B. said securing means is a nut adapted to be turned down on said threaded portion and retain said bushing in said plate.

10. An improved mounting assembly as defined in claim 6:
    A. wherein said bushing is engaged over said valve shaft with said lip facing said housing, and
    B. further including means projecting from said housing and engaging said lip so as
       1. to prevent said housing from rotating relative to said plate when said shaft is turned, but
       2. to allow said housing to cock relative to said plate when sideways forces are applied to said shaft so that substantially no relative movement occurs between said rotor and said housing due to said sideways forces.

11. An improved mounting assembly as defined in claim 10 wherein said projecting means overhangs said lip so as to prevent said housing from moving axially away from said plate.

12. An improved mounting assembly as defined in claim 11 wherein said projecting means comprise one or more screws protruding from said housing toward said plate.

13. An improved mounting assembly as defined in claim 11 further including an abutment affixed to said shaft just in front of said bushing to prevent axial movement of said shaft out of said bushing.